(12) United States Patent
Dragone

(10) Patent No.: US 6,542,655 B1
(45) Date of Patent: Apr. 1, 2003

(54) N×N CROSSCONNECT SWITCH USING WAVELENGTH ROUTERS AND SPACE SWITCHES

(75) Inventor: Corrado P. Dragone, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/653,448

(22) Filed: Aug. 31, 2000

(51) Int. Cl.[7] .............................. G02B 6/26; G02B 6/42
(52) U.S. Cl. .......................................... 385/17; 359/124
(58) Field of Search .............................. 385/15, 16, 17, 385/37; 359/124

(56) References Cited

U.S. PATENT DOCUMENTS

| | | | |
|---|---|---|---|
| 5,369,514 A | * 11/1994 | Eilenberger et al. | 319/123 |
| 5,627,925 A | * 5/1997 | Alferness et al. | 385/17 |
| 5,745,612 A | * 4/1998 | Wang et al. | 385/24 |
| 6,335,992 B1 | * 1/2002 | Bala et al. | 385/17 |

OTHER PUBLICATIONS

Bernasconi, P., Doerr, C. R., Dragone, C., Cappuzzo, M., Laskowski, E., and Paunescu, A., "Large N× Waveguide Grating Routers," Journal of Lightwave Technology System IEEE Communications Magazine, 18(7): pp. 985–991, Jul. 2000 May 1987.

Dragone, C., "Optimum Design of a Planar Array of Tapered Waveguides," J. Opt. Soc. Amer. A., vol. 7, No. 11, pp. 2081–2093, Nov. 1990, Applied Optics, Apr. 26, 1987.

Dragone, C., "An N × N optical multiplexer using a planar arrangement of two star couplers," IEEE Photon. Technol. Lett., vol. 3, pp. 812–815, Sep. 1991.

* cited by examiner

*Primary Examiner*—Cassandra Spyrou
*Assistant Examiner*—Alessandro V. Amari
(74) *Attorney, Agent, or Firm*—John A. Caccuro

(57) ABSTRACT

An N×N crossconnect switch, for large N, is implemented using an arrangement of smaller wavelength routers combined with space switches. An N×N crossconnect switch is constructed in three stages, using a plurality of input space switches, a plurality of (N/m)×(N/m) router (whose reduced size N/m allows efficient realization in integrated form), and a plurality of output space switches. In the router, the number of wavelengths is reduced by a factor m. The input and output space switches can be implemented using crossbar or Clos type construction. In one arrangement each modulator is combined with a small space switch consisting of 2×2 elements. Each space switch can be realized with negligible crosstalk by using a dilated arrangement.

21 Claims, 15 Drawing Sheets

FIG. 1 m=2, n=$\frac{N}{2}$ m=2, FULLY DILATED

US 6,542,655 B1

N×N CROSSCONNECT SWITCH USING WAVELENGTH ROUTERS AND SPACE SWITCHES

TECHNICAL FIELD OF THE INVENTION

The present invention relates to optical crossconnect switches and, more particularly, to an N×N crossconnect switch implemented using wavelength routers combined with space switches.

BACKGROUND OF THE INVENTION

In high capacity optical networks, an essential device is the N×N crossconnect switch. The function of this device is to provide, at each node, full connectivity among several incoming fibers, each carrying several wavelength channels. The switch must be nonblocking, and it must be fast and efficient. If N is not too large, these properties can be realized by using a single N×N wavelength router combined with tunable transmitters capable of producing N wavelengths. However, this technique is only feasible if the size N of the router is not too large. This is because as N increased, the N×N router was difficult to realize in integrated form with satisfactory performance of low loss and low crosstalk, and each transmitter had to provide N wavelengths.

With the ever-increasing capacity of optical networks there is continuing need for even larger N×N crossconnect switches.

SUMMARY OF THE INVENTION

In accordance with the apparatus of the present invention, the problem of implementing a N×N crossconnect switch, for large N, is solved by using an arrangement of smaller wavelength routers combined with space switches. In the prior art, a large N×N switch implemented using a router was difficult to realize in integrated form, with satisfactory performance of low loss and low crosstalk, and each transmitter had to provide N wavelengths. According to the present invention, the number of router wavelengths is reduced by a factor m and the N×N crossconnect switch is constructed in three stages using space switches and smaller routers. The input and output space switches can be implemented using crossbar or Clos type construction. In the crossbar construction, the input and output switches are 1×2 and 2×1 switches respectively. In the Clos construction, the input stage uses m×(2m−1) space switches and the output stage uses (2m−1)×m space switches. In both the crossbar or Clos type construction, the reduced size of the center stage, using (N/m)×(N/m) wavelength routers, allows efficient realization in integrated form. Using input space switches with tunable transmitters, each with N/m wavelengths, provides full non-blocking connectivity of the N×N crossconnect switch. In one arrangement, the input and output space switches are implemented using 2×2, 1×2, and 2×1 switch elements. In one input space switch embodiment, a data modulator is combined with the 2×2 switch elements and integrated on a single wafer. Each input and output space switch can be realized with negligible crosstalk by using a dilated arrangement.

More particularly, my invention is directed to an N×N nonblocking optical switch for providing a connection between any of N inlets and any of N outlets, the N×N switch comprising an input stage including a plurality of input space switches, each input of each of the input space switches connects to a different one of the N inlets;

an output stage including a plurality of output space switches, each output of each of the output space switches connects to a different one of the N outlets; and a center stage connected between the input stage and the output stage, the center stage including a plurality of N/m×N/m wavelength routers, wherein a connecting link is provided between each N/m×N/m wavelength router and each input or output switch, so that each N/m×N/m wavelength router connects to each input space switch and each output switch.

BRIEF DESCRIPTION OF THE DRAWINGS

In the drawings.

In the following description, identical element designations in different figures represent identical elements. Additionally in the element designations, the first digit refers to the figure in which that element is first located (e.g., 102 is first located in FIG. 1).

DETAILED DESCRIPTION

A nonblocking N×N switch is realized using wavelength routers as building blocks. Each router [1,2] is a strictly nonblocking switch, which allows the destination of each input signal to be changed by simply changing the signal wavelength. (Note in this specification, a reference to another document is designated by a number in brackets to identify its location in a list of references found in the Appendix B) With reference to FIG. 1, there is shown a prior art wavelength router consisting of a waveguide grating 101 between two free-space 'slab' regions, 102 and 103. The input and output waveguides are spaced by a along the input and output boundaries of the router and the waveguide grating arms 101 are spaced by b along the slab regions. In a well-known manner, changing the wavelength of a signal on any of the N input waveguides changes to which of the N output waveguides the signal is switched.

Figure 1:
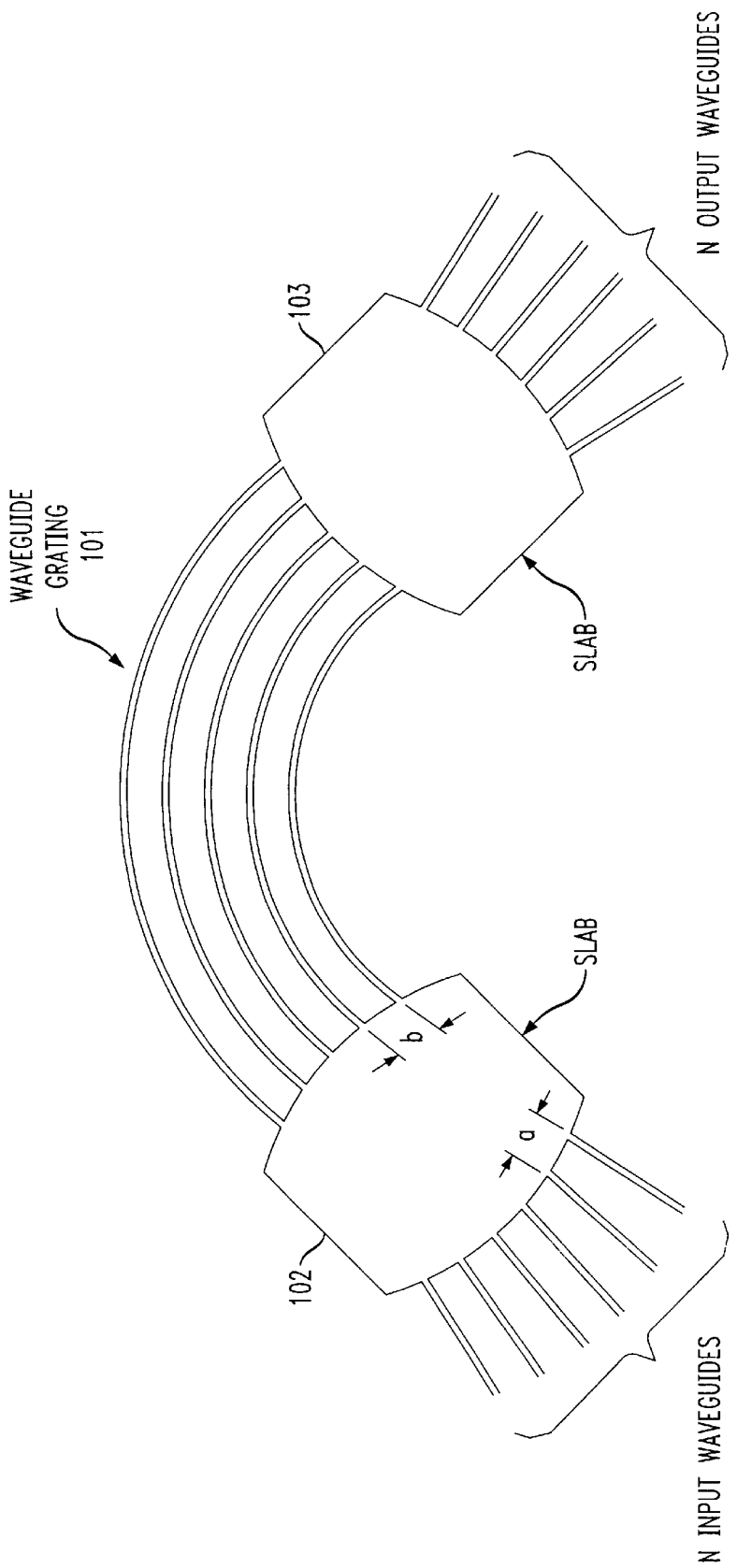
FIG. 1 shows a prior art wavelength router consisting of a waveguide grating between two free-space regions. The input and output waveguides are spaced by a along the input and output boundaries of the router.
Figure 2:
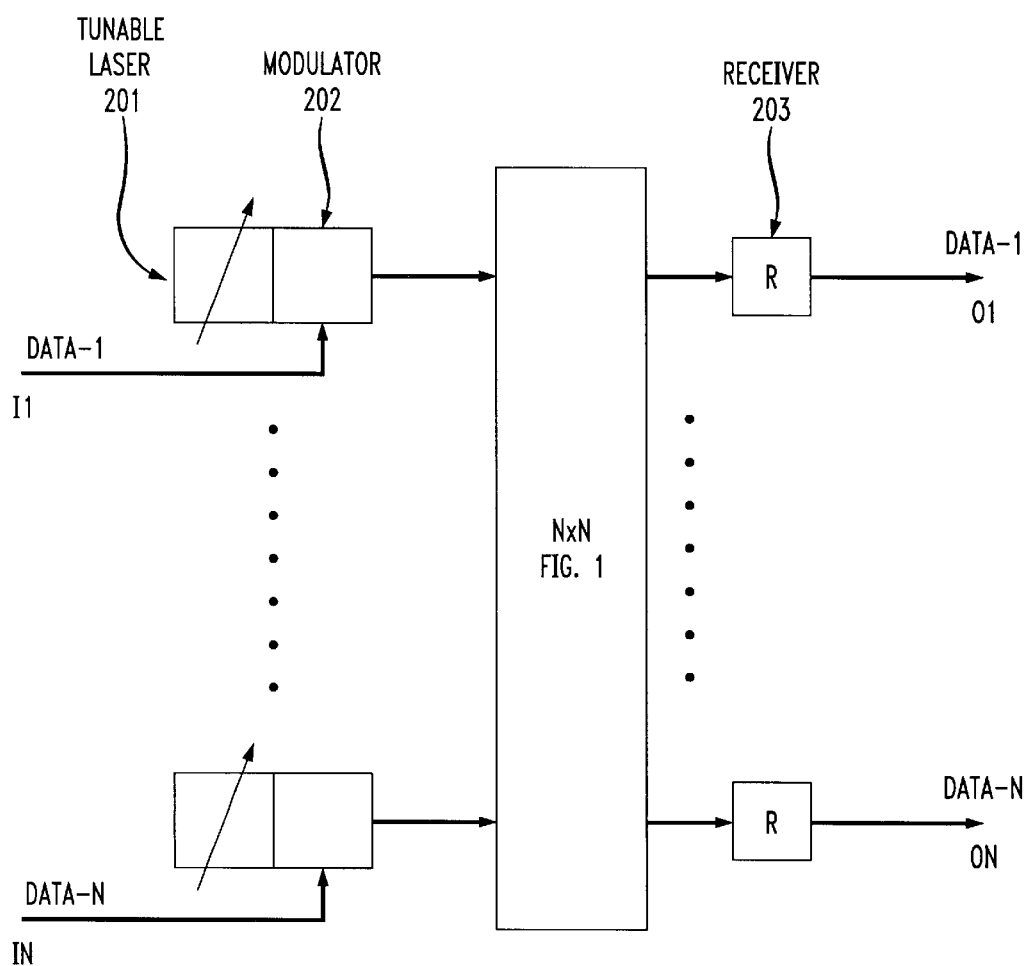
FIG. 2 shows a nonblocking cross-connect switch consisting of a N×N wavelength router combined with N tunable lasers, N modulators and N receivers.

Shown in FIG. 2, is a nonblocking cross-connect switch consisting of a N×N wavelength router of FIG. 1 combined with N tunable lasers 201, N modulators 202 and N receivers 203. When N is not too large, the arrangement of FIG. 1 or FIG. 2 can be realized by using a single router. Then, each input signal must be produced by a multiwavelength laser capable of N wavelengths [1], and each input signal can be transmitted to any particular output port by simply selecting the appropriate laser wavelength. Thus, at any of the inputs I1–IN, by changing the wavelength of the associated laser, the data signals Data-1 through Data-N can be switched to any of the outputs O1–ON. Illustratively, the Data-1 signal on input I1 is shown switched to output ON, while the Data-N signal is switched to output O1.

Figure 3:
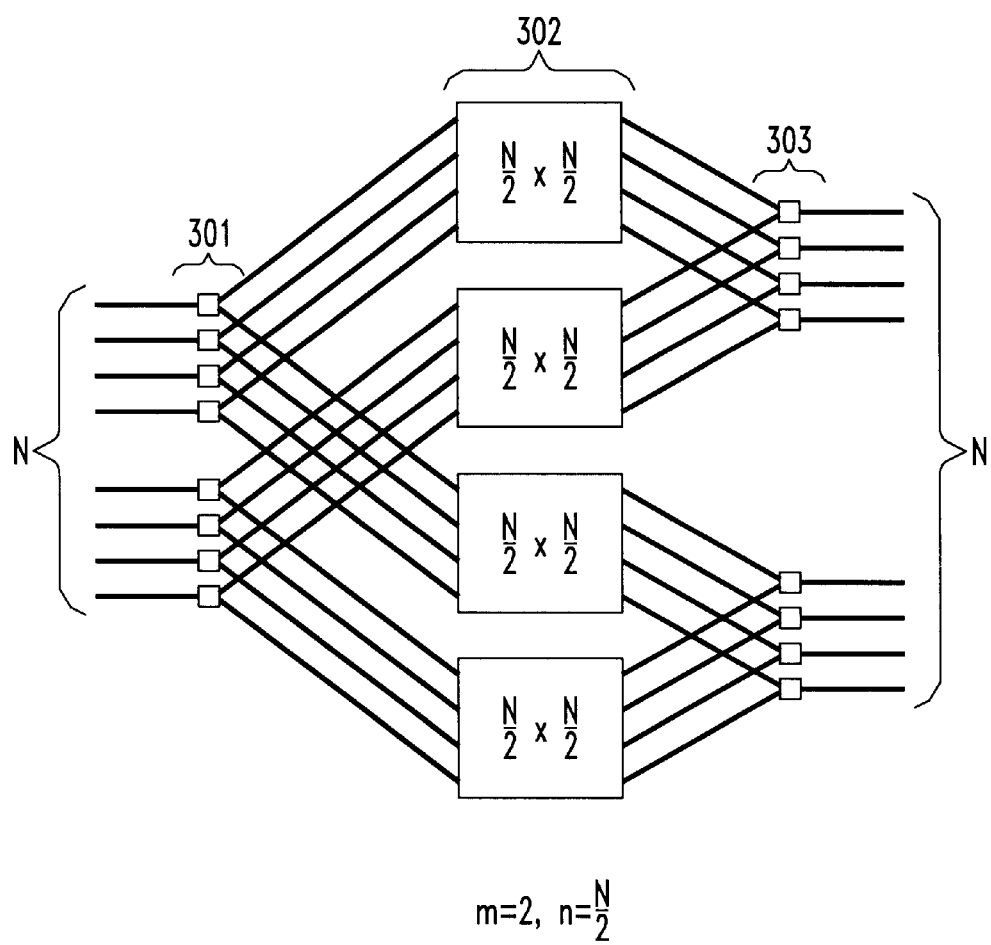
FIG. 3 shows a nonblocking cross-connect switch realized in three stages using a crossbar construction. The building blocks in the central stage are N/2×N/2 routers.
Figure 4A:
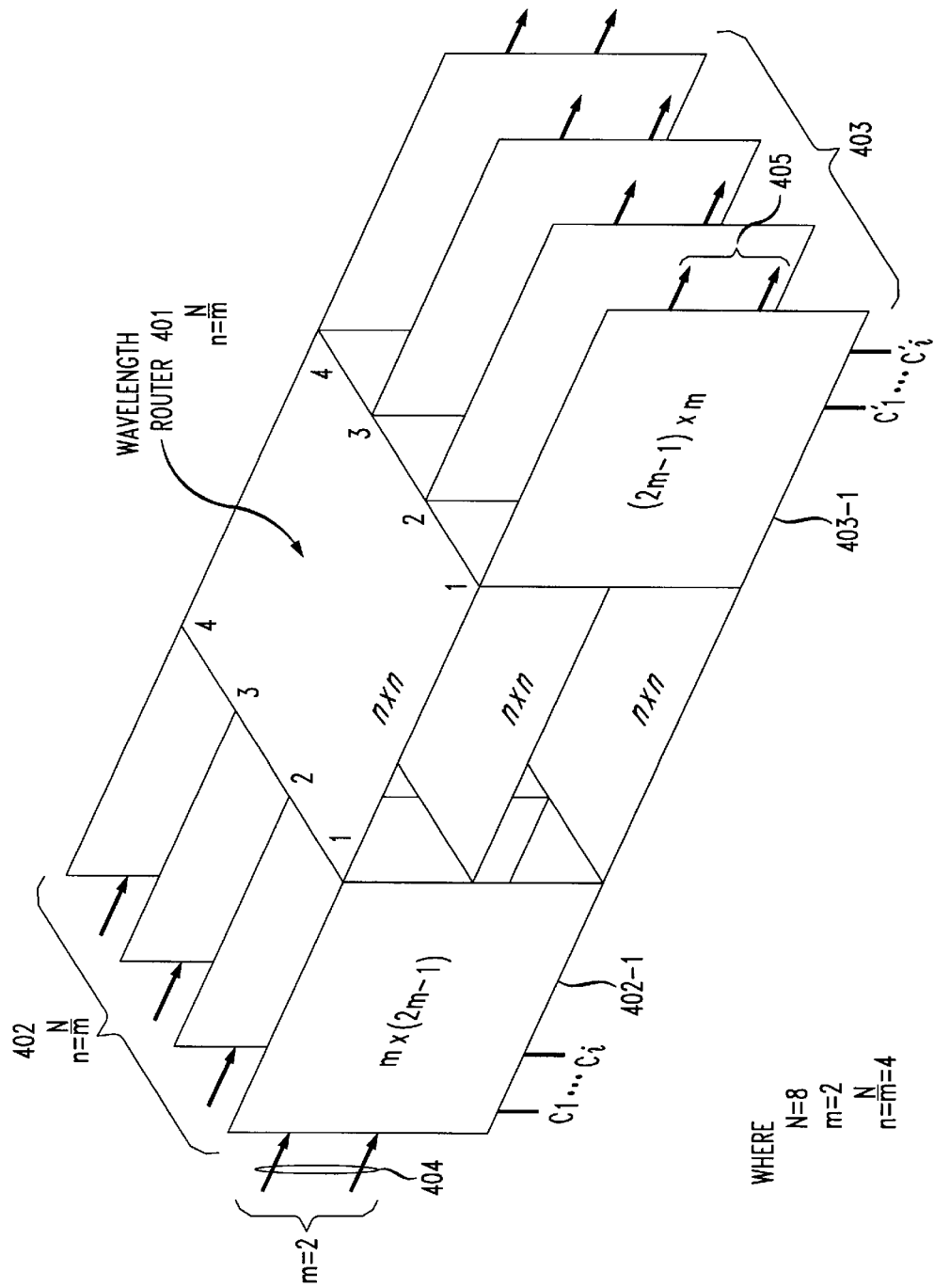
FIG. 4a shows an illustrative physical embodiment, and FIG. 4b a block diagram, of the invention using a nonblocking N×N cross-connect switch realized using Clos arrangement. The building blocks in the center stage are n×n routers and, in the other two stages, m×(2m−1) and (2m−1)×m space switches.

However for large values of N>64, this type of cross-connect switches is difficult to realize using this technique, as discussed in Appendix A. This is because each laser would then have to be capable of a large number of wavelengths, and also because the router would be difficult to realize in integrated form with satisfactory performance of low loss and low crosstalk for large N. In accordance with the present invention, this problem is solved for large N by realizing the N×N switch by using an arrangement of smaller routers. To this purpose an arrangement of (N/m)×(N/m) wavelength routers is combined with input and output stages S consisting of space switches as shown in FIGS. 3 and 4a. In FIG. 3, the N×N switch arrangement is realized with minimum loss and crosstalk by using a crossbar construction [3]. On the other hand, it may be desirable to reduce the number of routers by using a Clos arrangement[4], shown in FIG. 4a, in which case it is generally desirable to reduce loss, crosstalk and waveguides crossings must be minimized as shown here. A property of the FIG. 3 and FIG. 4a arrangements is that each signal traverses only one router. As a consequence, the prior art problems of constructing a large N×N switch are eliminated, since the number of wavelengths is reduced by a factor m, and the size of each router is also reduced by the same factor.

1. Optimum Arrangements

Returning to FIG. 1, there is shown a N×N router [5–7] consisting of N input waveguides, N output waveguides, two dielectric slabs 102 and 103, and a waveguide grating 101 connected between the two slabs. The input and output waveguides are connected to the two slabs, and the waveguides (arms) of the grating 101 between the two slabs are characterized by a constant path-length difference. As a consequence each transmission coefficient from a particular input waveguide to a particular output waveguide is essentially characterized by periodic behavior, with equally spaced peaks, and each peak is produced by a particular order of the grating.

Ideally one would like to realize a switch by using a single N×N wavelength router characterized as in [5,7] by a comb of N wavelengths such that the transmission coefficient from any input port (waveguide) to any output port has a transmission peak at one of the above wavelengths. In reality, if the router of [5] is designed to produce the above property for a particular input port, for instance the central port, one finds that the above property only approximately applies to the other ports. As a consequence, it is shown in Appendix A that the router is afflicted by wavelength errors that increase with N. Because of these errors, some of the wavelengths of maximum transmission deviate from the above comb of N wavelengths. In order to keep the resulting losses below 1 dB, one must require $$N < 36 \sqrt{\frac{100}{\text{GHz}}}.$$

GHz being the channel spacing in GHz. For instance, for a channel spacing of 50 GHz, one must require N<52. This value can be increased by a factor 1.25 by modifying the router, by widening its passband as in [6], but this technique also increases loss and crosstalk by about 3 dB.

The above restriction only arises because here we specify the same comb of N wavelength for all input ports. By allowing a different comb of wavelengths for each input port, the above restriction would be eliminated [2], but a total of N different combs (including a total of 2N–1 wavelengths) would then be required in order to provide maximum transmission from all input ports. This would make the arrangement more difficult to realize since each laser would have to produce a different comb, centered at a different wavelength.

The above considerations give one reason for which small values of N are desirable in FIG. 1. As pointed out earlier, additional reasons are 1) that it is generally desirable to simplify the laser design by reducing the number of wavelengths required from each laser and 2) that a router with large N>64 is difficult to design in integrated form with satisfactory values of loss and crosstalk.

In view of the above difficulties it is advantageous for large N to realize the N×N switch by using, instead of a single N×N router, a combination of smaller n×n routers where n=N/m and the reduction factor m is a suitable integer. Thus a N×N switch is realized in three stages, consisting of a central stage of n×n routers combined with input and output stages of nonblocking space switches as shown in FIGS. 3 and 4. A well-known property of these arrangements is that they are nonblocking in the wide sense if the routers are replaced by nonblocking space switches, and a large enough number of such switches is used. Then, if any particular input port and any particular output port are idle, one obtains the following nonblocking property: It is possible to simultaneously establish input and output paths from the above ports to a particular switch in the central stage without disturbing any of the other active paths. That is, none of the existing connections need be disturbed.

It should be noted that in the prior art, large N×N switch arrangements were realized previously by using space switches, in which case their nonblocking properties are well known. Here, however, we use a combination of routers and switches in which case the nonblocking properties are only retained if no signal passes through more than one router. This condition is sufficient to insure that the signal can be transferred to the appropriate output port of the router by properly choosing the signal wavelength. Clearly one would like all routers to be characterized by the same comb of wavelengths, and the above conditions can be satisfied in FIGS. 3,4 in different ways. The simplest and most important arrangements are obtained by using the constructions of FIGS. 3,4 with n×n routers characterized by n=N/m, where m is a suitable reduction factor. The purpose of the input and output stages in this case is to produce the appropriate reduction factor m, and one finds that the two constructions of FIGS. 3,4 have different advantages and disadvantages. For m=2, the crossbar construction of FIG. 3 is attractive for the simplicity of its input 301 and output 303 stages, and it has the advantage of minimizing loss and crosstalk. As shown in FIG. 3, the central stages are (N/2)×(N/2) routers, i.e., 4 ×4, when N=8 and m=2. Larger m can be realized by repeated application of the same construction. For m=4, N=16, for instance, one can replace each (N/2)×(N/2) router in FIG. 3 with a crossbar arrangement of (N/4)×(N/4) routers. By this procedure, each switch in the central stage is realized by the same construction of FIG. 3, but with N replaced everywhere by N/2. More generally, by repeated application of the above construction, higher powers of 2 for N can be realized by increasing the reduction factor m by factors of 2. Thus, for any N and m equal to a power of 2, the central stage consists of n×n routers with n=N/m and m=$2^s$ where s is a suitable integer.

Figure 4B:
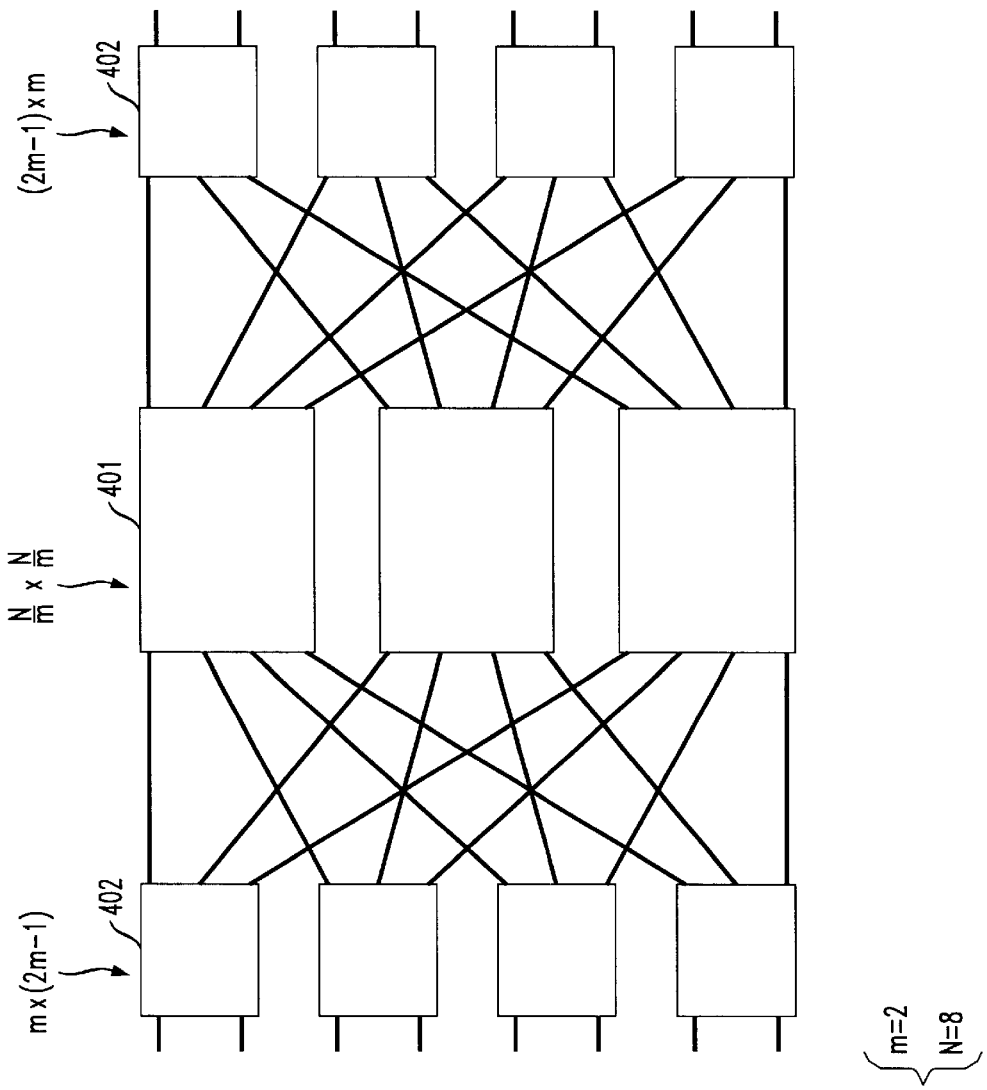
FIG. 4c shows a router reduction factor of 4, where each center stage block of FIG. 4b is realized by using 2×2 routers in an arrangement similar to that shown in FIG. 3.
FIG. 4d shows an arrangement, having a router reduction factor of 4, which is derived from Clos arrangement of FIG. 4b for N=16 and m=2 by realizing each center stage block of FIG. 4b using the FIG. 3 arrangement of N/4×N/4 routers.
FIG. 4e shows an arrangement, having a router reduction factor of 4, which is derived from Clos arrangement of FIG. 4b where each center stage block of FIG. 4b is itself implemented by a FIG. 4b arrangement.
FIG. 4f shows a m×p switch consisting of two stages of $m_1 \times p_1$ and $m_2 \times p_2$ switches. Notice that $m = m_1 m_2$ and $p = p_1 p_2$.
FIG. 4g shows the arrangement of FIG. 4f with each building block realized using the fully dilated 2×3 arrangement of FIG. 7.
FIG. 4h shows the arrangement of FIG. 4g with reduced depth and reduced switch element count obtained by removing redundant switch elements.

Shown in FIG. 4a is the physical arrangement of a Clos construction and FIG. 4b shows the equivalent block diagram thereof. The Clos construction, e.g., FIG. 4a, has the advantage, over the crossbar construction, e.g., FIG. 3, of requiring, for m=2, only three routers 401 instead of four. The Clos construction requires, however, larger building blocks for the input 402 and output 403 stages, as discussed later. Clearly, by repeated application of either construction, any power of 2 can be realized for the reduction factor m. As shown in FIG. 4a, for the generalized case, the number of input 402 or output 403 switches, m×(2m−1) or (2m−1)×m, is equal to n=N/m, the number of n×n routers utilized is equal to (2m−1), where N is the number of input ports and m is the reduction factor. Thus, for the example shown in FIG. 4a, where N=8, m=2, we have n=4 input 402 and output 403 switches and (2m−1)=3 routers 401 of size 4×4. As shown, each input switch is connected to each of the 3 routers 401, and therefore either one of the m=2 inputs 404 to an input switch, e.g., 402-1, can be switched to a particular input, input 1, of each of the 3 routers 401. The control leads C1 . . . Ci to input stage, e.g., 402-1, determine which input is switched to which router 401. At each of the 3 routers 401, the selection of wavelengths by the input stages 402 determines which router input (inlet) is switched to which router output (outlet), At the router output side, the same respective output, e.g., output 1, of each of the 3 routers 401 is connected to a different input of one of the 4 output stages, e.g., 403-1. At the output stage, e.g., 403-1, only 2 signals are transmitted to outlets 1 of the 3 routers 401 and these two signals are switched to become the 2 outputs 405. Again the control leads C1 . . . C'i to output stage, e.g., 403-1, determine which input is switched to which output. Note that the construction of the of input switches 402, m×(2m−1), is the mirror image of the output switches 403, (2m−1)×m.

Figure 4C:
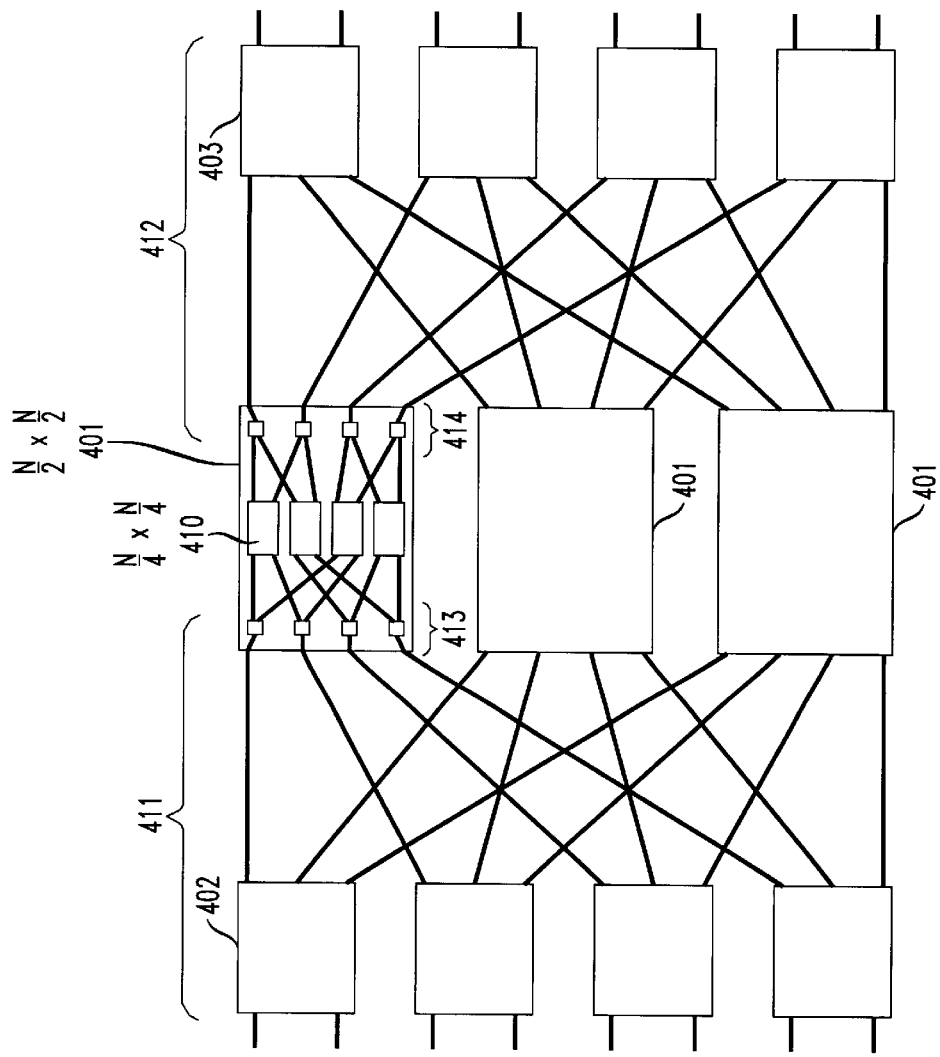
Figure 4D:
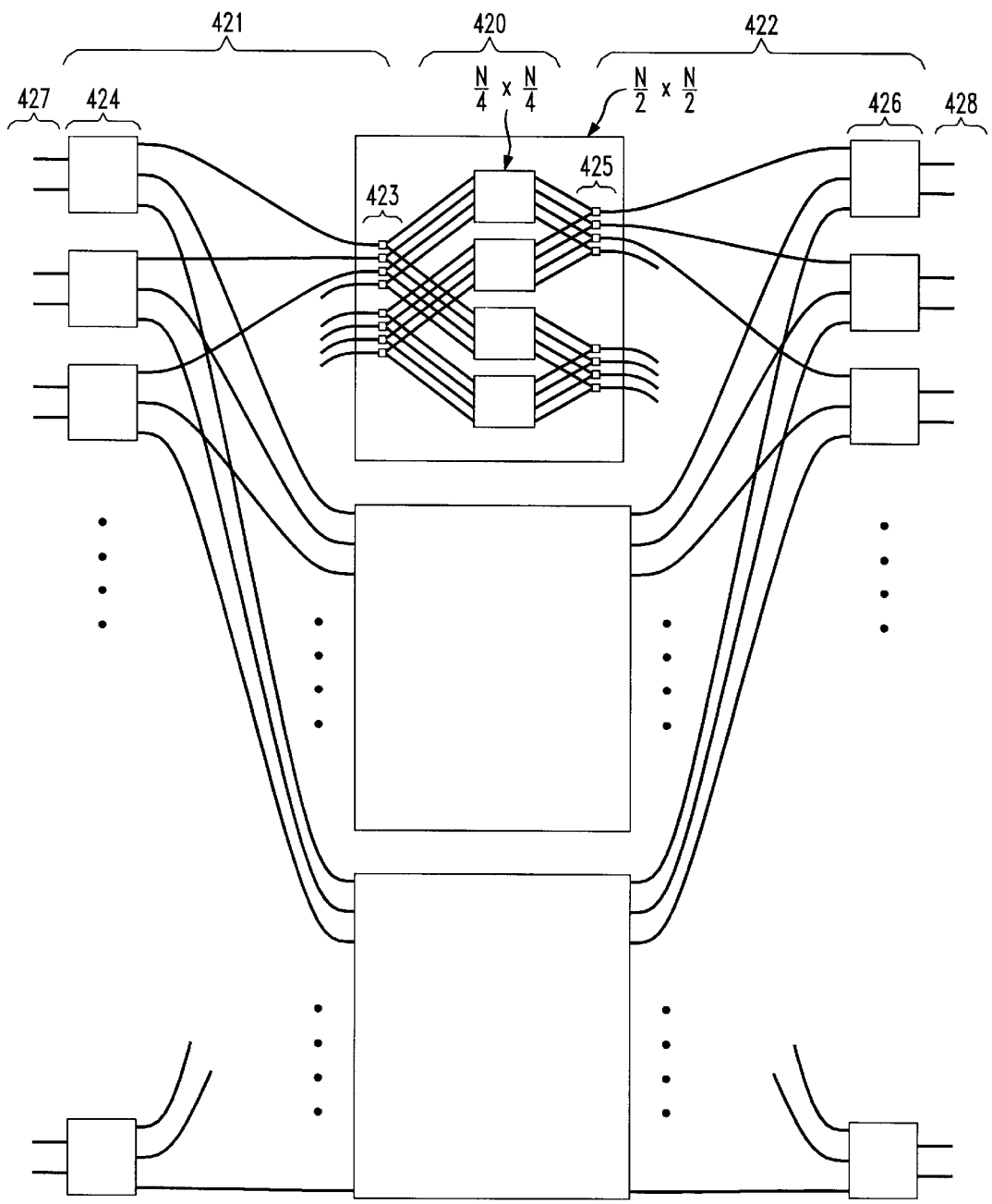

In FIGS. 4a and 4b, changing the reduction factor m can change the size of the routers and input and output stages. Thus, for a given N, increasing m by a factor of 2 reduces the size, n=N/m, of each router by a factor 2 and clearly this technique can be used with either the crossbar or Clos construction. As shown in FIG. 4c, for instance, is a switch arrangement where the router size used in each of the center stages 401 is further reduced by a factor of 2, and hence implemented using N/4×N/4 routers. Thus FIG. 4c illustrates a router reduction factor of 4, where each center stage block 401 of FIG. 4b is realized by using 2×2 routers in an arrangement similar to that shown in of FIG. 3. In FIG. 4c, the input stage 411 includes the 2×3 switches 402 and the 1×2 switch elements 413, the central stage includes the N/4×N/4 (i.e., 2×2) routers 410, and the output stage 412 includes the 2×1 switches 414 and the 3×2 switch elements 403. Note that while FIG. 4b is a Clos construction (i.e., each input stage 402 can access each center stage router 401), the arrangement of FIG. 4c is a non-Clos arrangement. Shown in FIG. 4d is a switch where N=16 and the reduction factor is m=4. In FIG. 4d, the switch is realized by the arrangement of FIG. 4a, with each building block 401 in the central stage realized by using the arrangement of FIG. 3 with N replaced by N/2. Then each central stage building block becomes a combination of 4 (N/4)×(N/4) routers as shown in FIG. 4d. The resulting arrangement consists of a central stage of 12 (N/4)×(N/4) routers 420. The twenty-four 1×2 space switches 423 together with the eight 2×3 space switches 424 would then become the input stage 421. The twenty-four 2×1 space switches 425 together with the eight 3×2 space switches 426 would then become the output stage 422. In this arrangement each signal at one of the 16 inlets, 427, is transferred by the input stage 421 to a particular (N/4)×(N/4) router, 420, and switched by the output stage to a particular one of the 16 outlets, 428. Therefore by properly choosing a signal wavelength, λ1 . . . λn, the signal at a switch inlet 427 can be switched via input stage 421 and router 420 to an appropriate outlet of the router, using a total of only n=N/4 wavelengths (4 in our example of N=16). Thus, each input signal laser (e.g., 1003 of FIG. 10) needs only to provide 4 wavelengths. At the output side of routers 420, the signal is then transferred by the output stage 422 to the appropriate switch outlet.

Figure 4E:
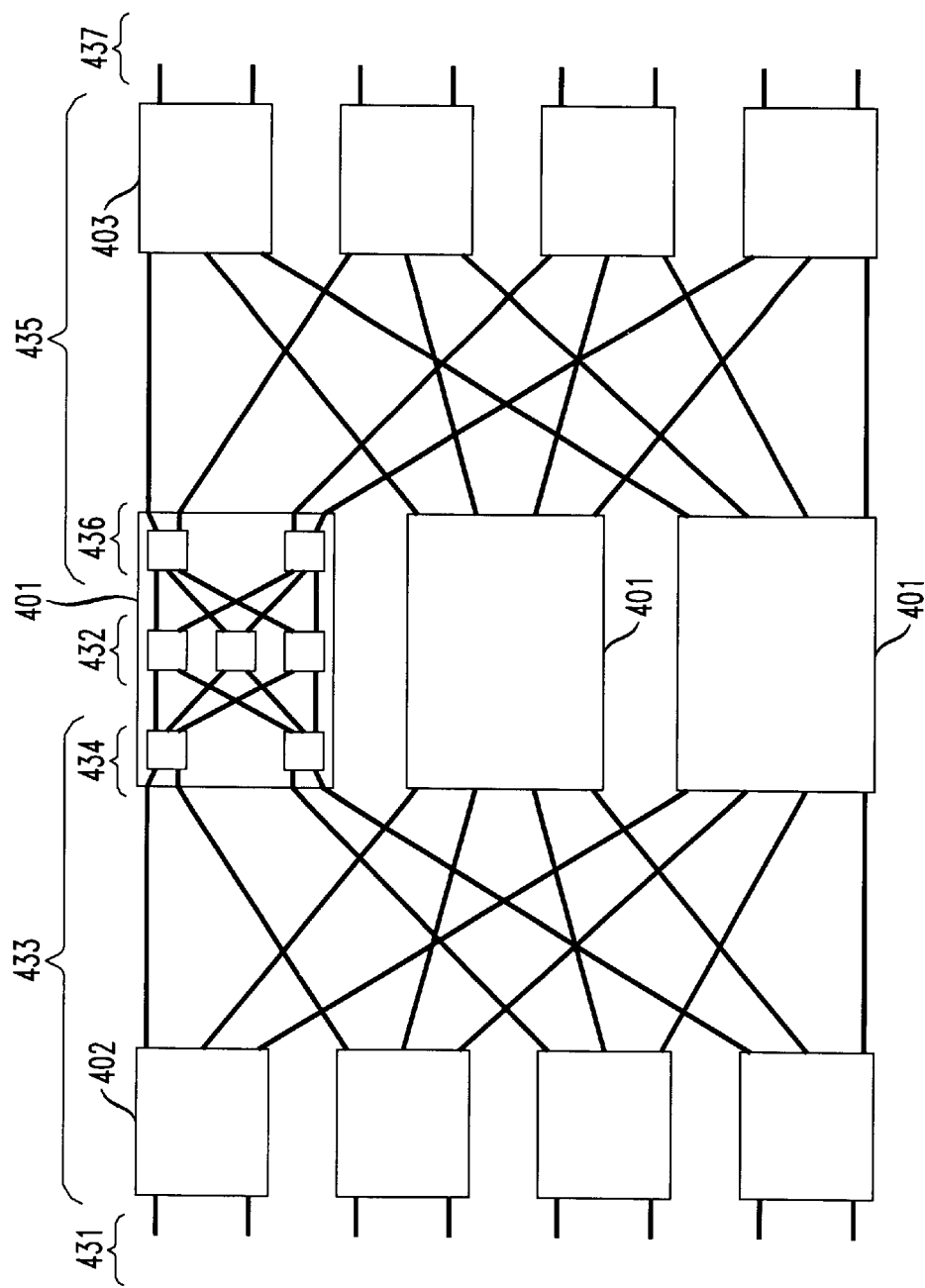

Shown in FIG. 4e is a Clos switch arrangement derived from FIG. 4a where the routers used in each of the blocks 401 of the center stage are further reduced in size by a factor of 2, and hence implemented using N/4×N/4 routers. Note that FIG. 4e is a Clos construction since each switch inlet 431 and outlet 437 can access each center stage router 432. Thus FIG. 4e illustrates a router reduction factor of 4, where each center block 401 is realized by using 2×2 routers in an arrangement similar to that shown in of FIG. 3. In FIG. 4e, the input stage 433 includes the switches 402 and 434, the central stage includes the N/4×N/4 routers 432, and the output stage 435 includes the switches 436 and 403.

2. Clos Arrangement with Wavelength Routers in the Central Stage

Figure 5:
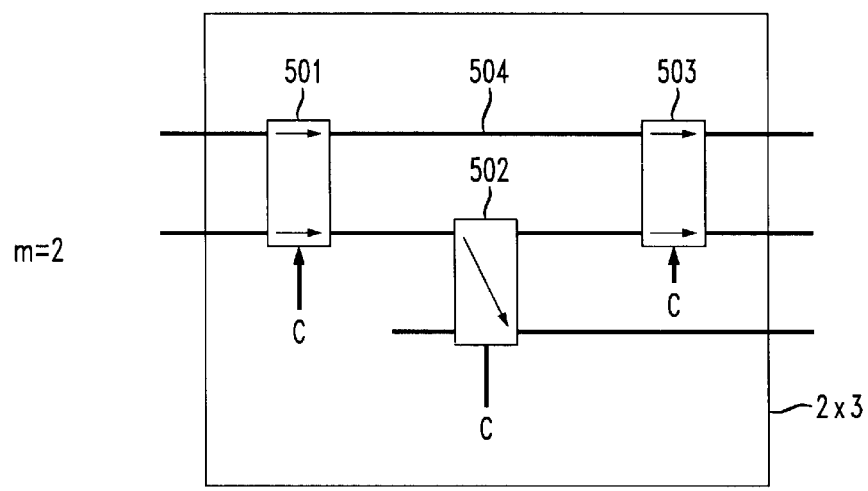
FIG. 5 shows a nonblocking 2×3 arrangement with minimum number of elements.

As pointed out earlier Clos arrangement minimizes the number of n×n wavelength routers in the central stage. On the other hand, it requires nonblocking m×(2m−1) and (2m−1)×m space switches in the input 402 and output 403 stages as shown in FIG. 4a and, for this reason, the arrangement is found to have higher loss and higher crosstalk than the crossbar arrangement of FIG. 3. It is therefore important to optimize the input and output switches as shown next. Notice FIG. 4a requires in general 2m−1 routers and, in the special case m=2, it requires only three routers. Since m=2 is simplest to realize, and it can be used to realize any higher power of 2, it is the most important case in practice, and each m×(2m−1) switch can then be realized as in FIG. 5 by using an arrangement of elements without waveguides crossings. With reference to FIG. 5, there is shown a nonblocking 2×3 arrangement implemented with a minimum number 3 of 2×2 switching elements. Each of the 2×2 switching elements operate under control of a control signal C which controls whether the element is in a bar state, e.g., 501 and 503, or a cross state, e.g., 502. Note that none of the waveguides, e.g., 504, that interconnect the 3 elements 501–503 cross each other. Notice the 'depth' is generally defined as the total number of elements along the path of a particular signal, and it is an important parameter that determines loss and crosstalk. Thus, the depth of the 2×3 arrangement is two since a signal at an input port must pass through at most two elements to reach an output port.

Figure 6:
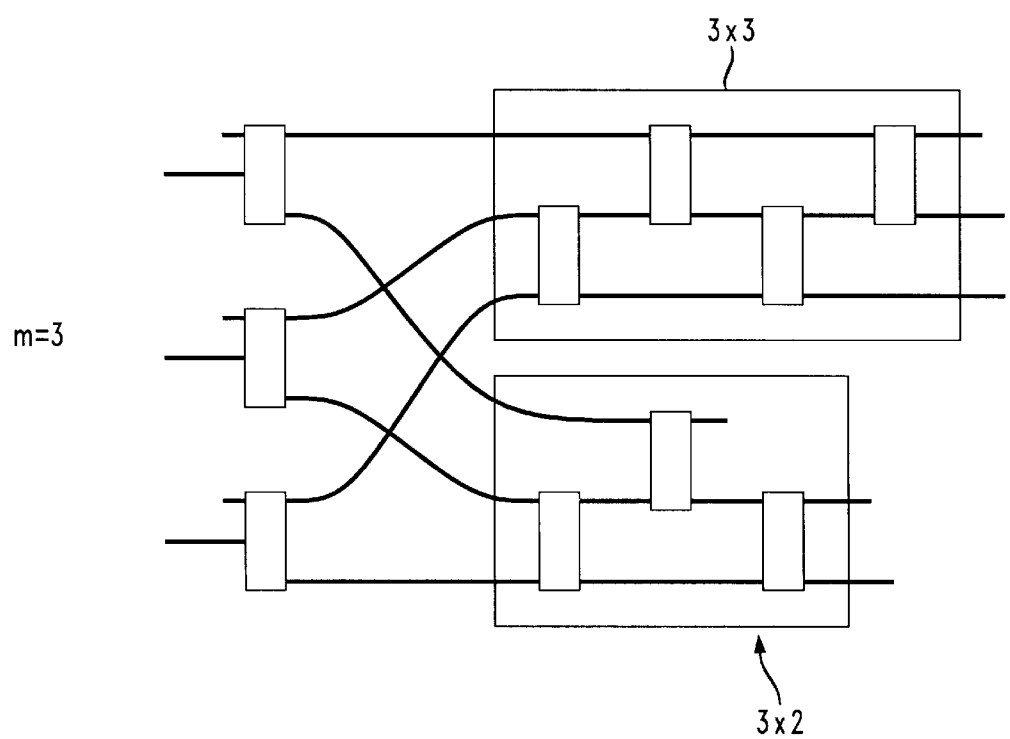
FIG. 6 shows a nonblocking 3×5 arrangement with minimum number of elements.
Figure 7:
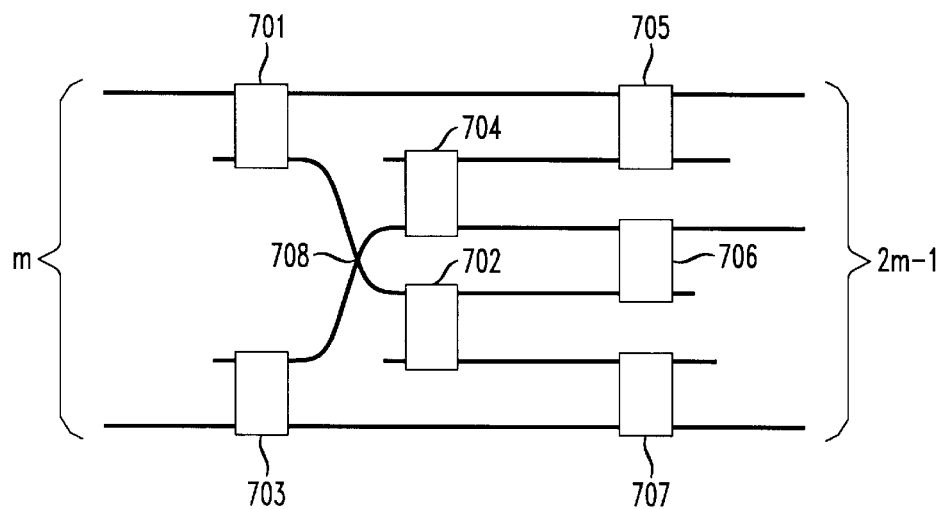
FIG. 7 shows a crossbar input space switch having two 1×2 input switches, two intermediate 1×2 switches, and three 2×1 output switches.
Figure 8:
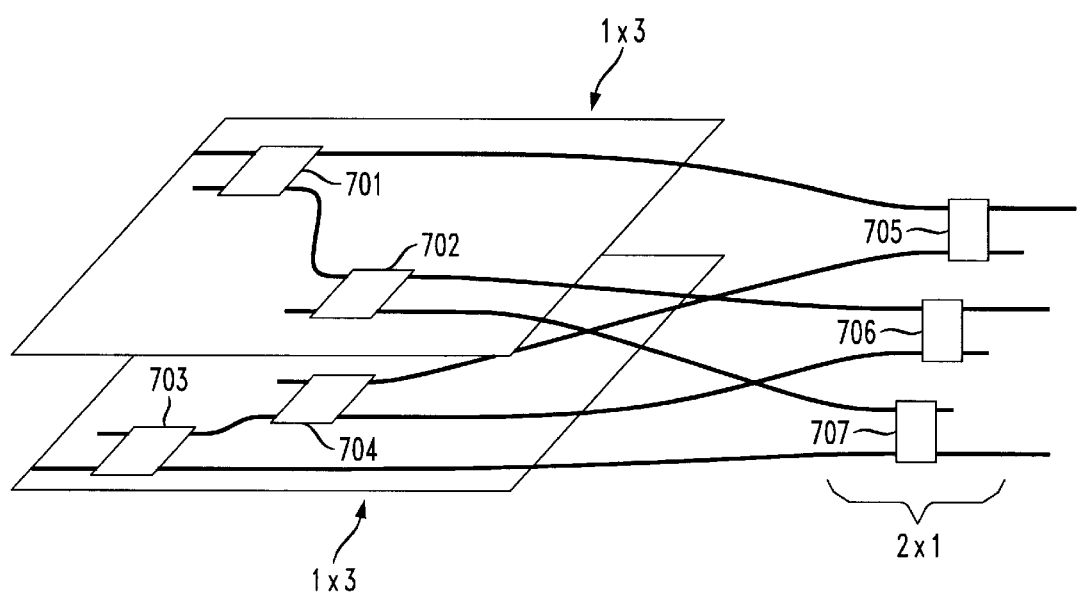
FIG. 8 shows a crossbar input space switch of FIG. 7 as a combination of binary trees with two 1×3 input switches and three 2×1 output switches.
Figure 9:
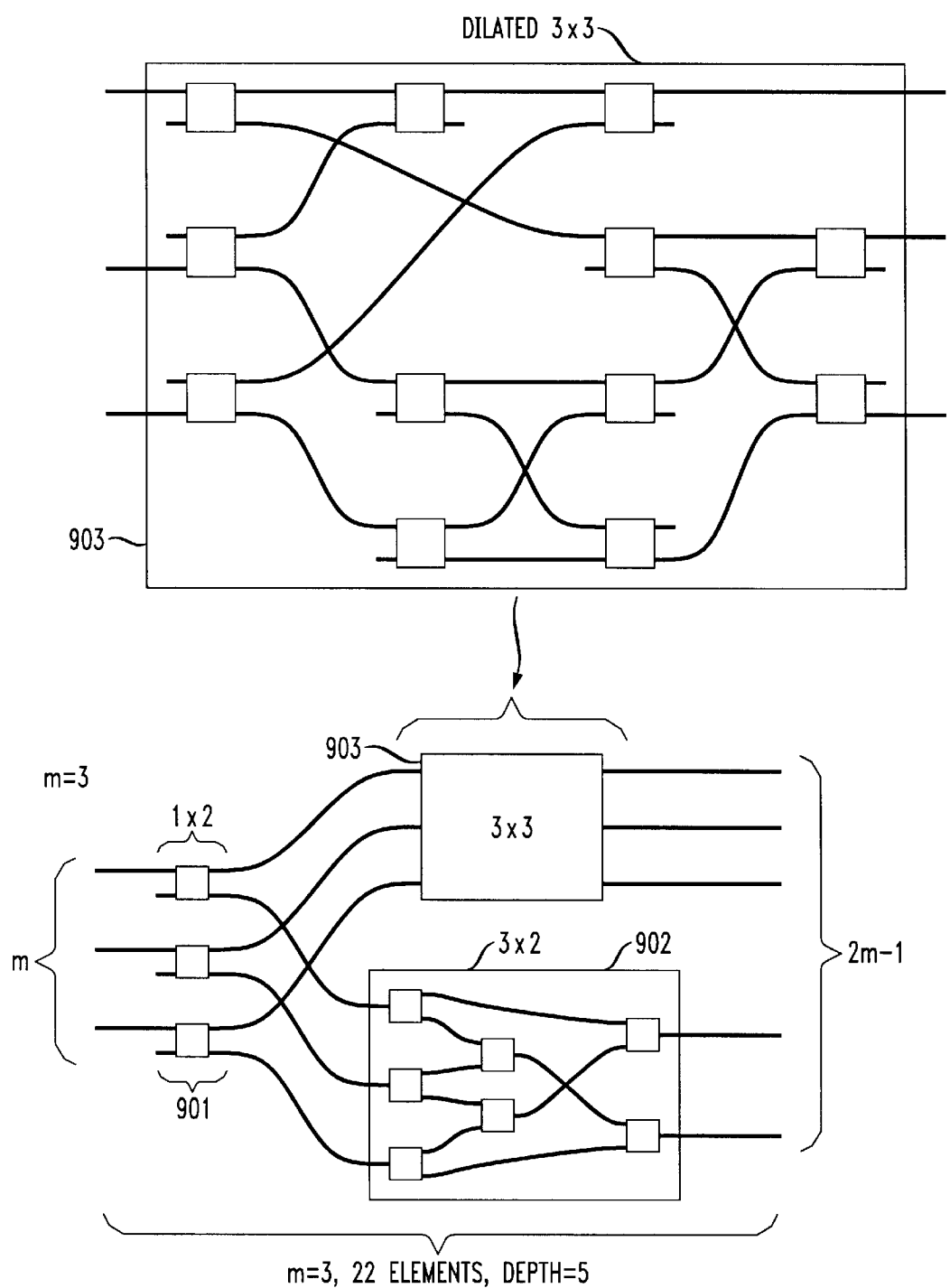
FIG. 9 shows a nonblocking 3×5 crossbar arrangement with minimum depth.

For m=3, on the other hand, one finds that a total of ten 2×2 elements is required and the optimum m×(2m−1) arrangement with minimum depth is shown in FIG. 6. As shown, 3 elements are used as 1×2 elements, 3 elements form a 3×2 arrangement, and 4 elements form a 3×3 arrangement. However, a disadvantage of Clos arrangement of FIG. 4a as compared to the crossbar arrangement of FIG. 3 is that it has higher crosstalk. Indeed, in FIG. 3, each input and output element receives only one signal and, as a consequence, negligible crosstalk is caused by the element extinction ratio. In comparison in FIGS. 5 and 6, some of the elements, e.g., 501 and 503 of FIG. 5 simultaneously receive two signals, and appreciable crosstalk is then caused by the elements' extinction ratio. An attractive solution to this problem is to modify the arrangements of FIGS. 5 and 6 so as to insure that each element is traversed by only one signal, e.g., like 502 of FIG. 5. We have derived for m=2 the arrangement of FIG. 7, which is referred to as a fully dilated 2×3 arrangement. This is the optimum arrangement satisfying the above condition with minimum number of elements and minimum depth. It is a crossbar arrangement of binary trees, and it consists of two 1×3 input switches (701,702 and 703,704 form separate 1×3 switches) combined with three 2×1 output switches, 705–707, as shown in FIG. 8. As shown, the arrangement includes 7 elements, and it has only one waveguide crossing 708. Similarly for m=3 the optimum m×(2m−1) dilated arrangement is realized with minimum depth, of 5, by using 22 elements forming a crossbar arrangement of input and output binary trees, as shown in FIG. 9. Three 2×2 elements 901 are used as 1×2 elements, 7 elements form a 3×2 element 902, and 12 elements form a 3×3 element 903. Each 2×2 element in the above dilated arrangements is used as a 1×2 or 2×1 element, and hence it is traversed by only one signal, and therefore high extinction ratio is not required for the various elements. On the other hand, the arrangements of FIGS. 5 and 6 are clearly simpler, and these are the preferred arrangements if the 2×2 elements have high extinction ratios.

As previously noted, the depth is generally defined as the total number of elements along the path of a particular signal, and it is an important parameter that determines loss and crosstalk. Also important in general is the depth given by the total number of columns formed by the various elements, since it determines the wafer size when the arrangement is realized integrated form a single wafer. The arrangement of FIG. 3 has the lowest depth. On the other hand, if only three routers are used in the central stage (FIG. 4a), then the arrangements of FIGS. 5 and 6 minimize depth, number of elements, and waveguides crossings.

Figure 4F:
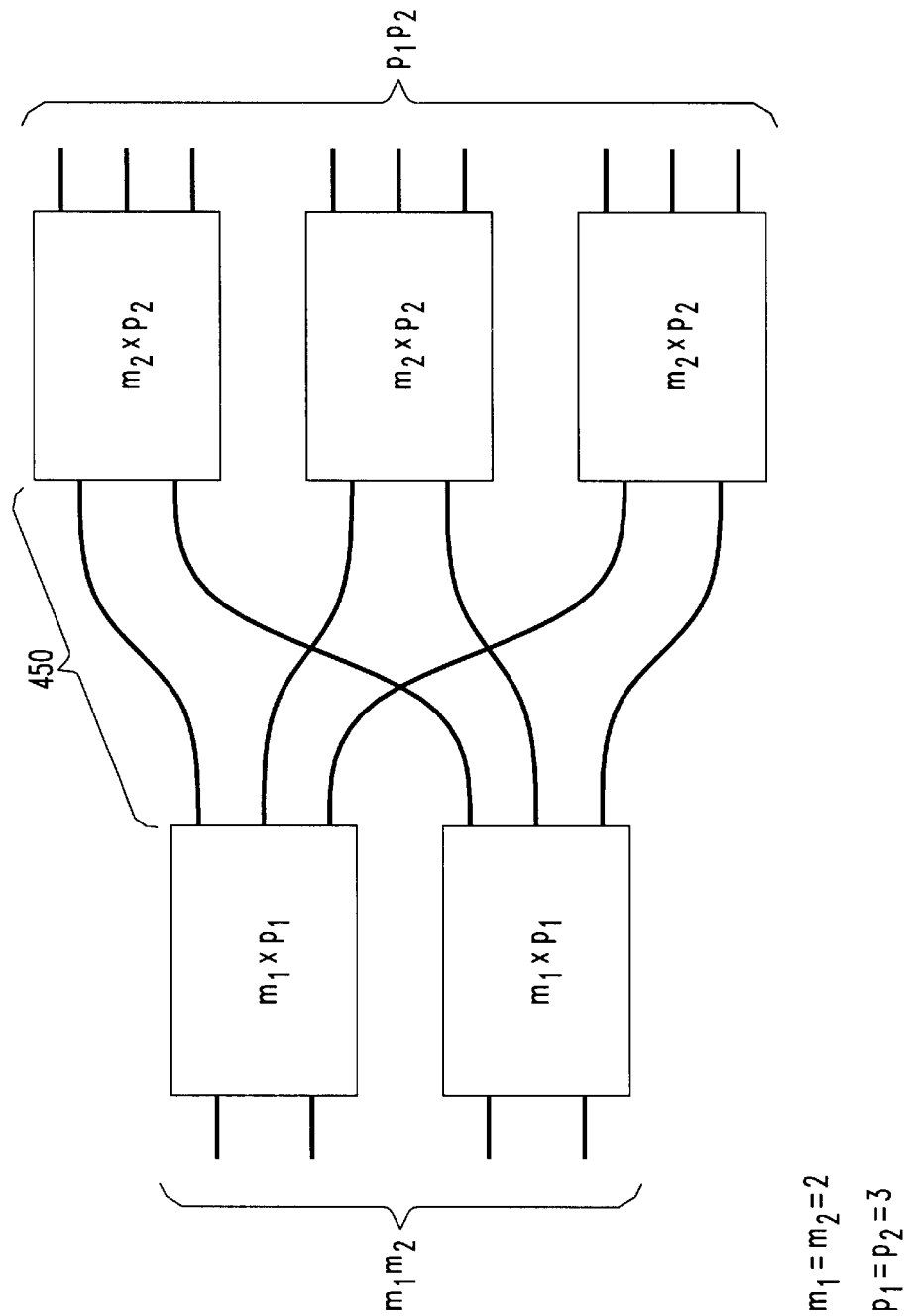
Figure 4G:
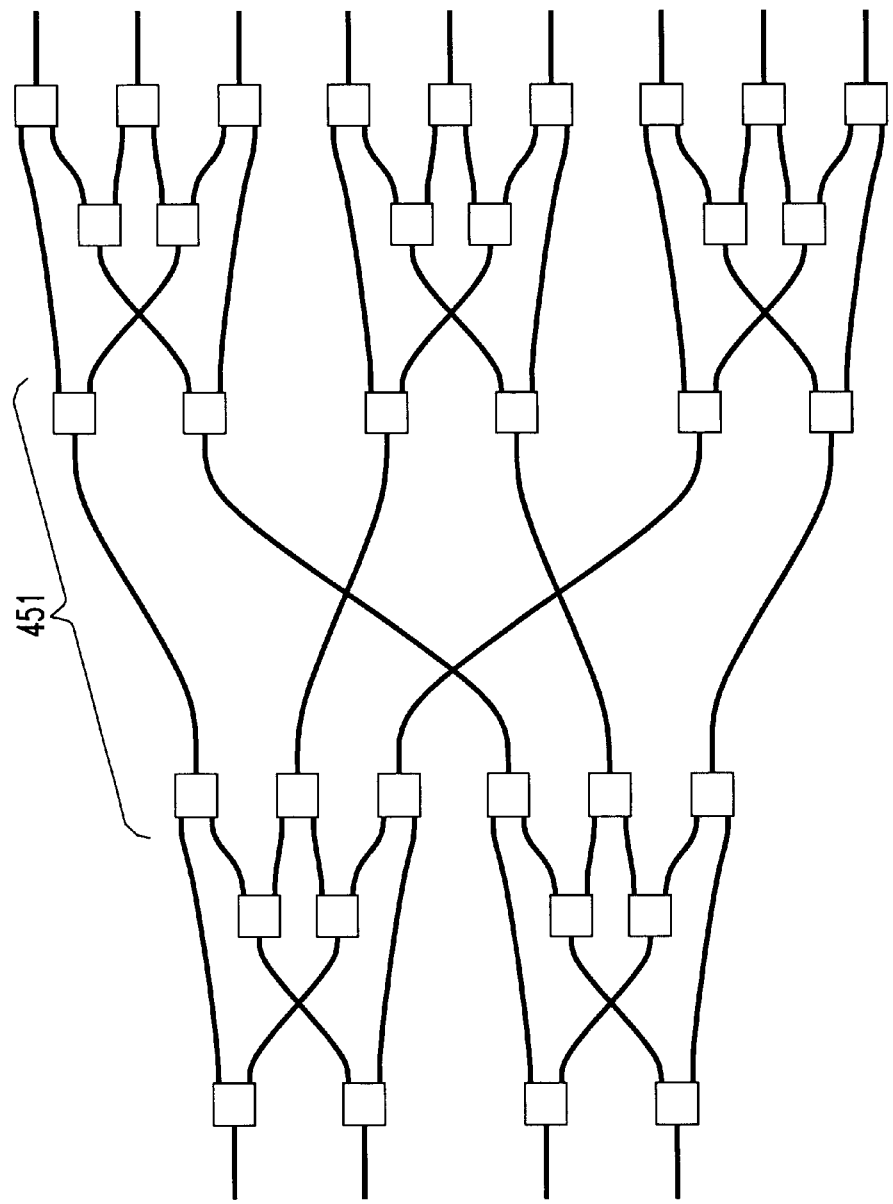
Figure 4H:
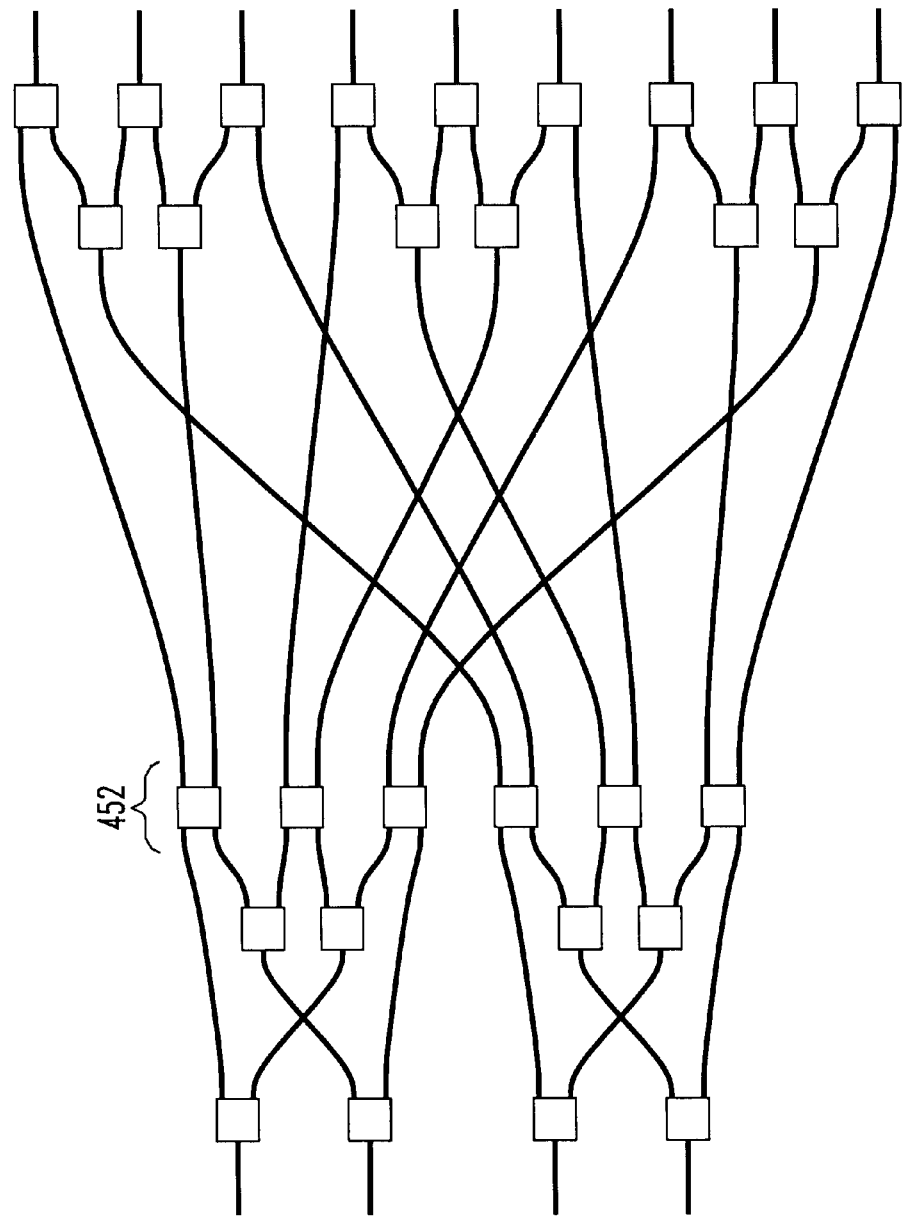

As pointed out earlier, repeated application of Clos construction produces an arrangement with reduction factor equal to the product of the individual factors. For instance two successive applications of Clos construction with factors $m_1$ and $m_2$ produce $m=m_1m_2$, and the result is an input stage arrangement similar to that of FIG. 4b, as shown in FIG. 4f. The only difference is that the input stage is now made up of m×p switches, instead of m×(2m−1) switches, and similarly the output stage consists of p×m switches, with $m=m_1m_2$ and $p=p_1p_2$ with $p_1=2m_1-1$ and $p_2=2m_2-1$. Each FIG. 4f switch now consists of two stages respectively made up of $m_1 \times p_1$ and $m_2 \times p_2$ switches. The input and output switches are now characterized by p>2m−1 and, therefore, the number of center blocks can be reduced by realizing the N×N arrangement in a single step, by using the arrangement of FIG. 4b with $m=m_1m_2$ and using m×(2m−1) and (2m−1)×m input and output switches. On the other hand simpler input and output switches are obtained by using the arrangement of FIG. 4d obtained with two applications of Clos construction. In particular, from the arrangement of FIG. 4f, one can realize for m=4 a fully dilated arrangement with $m_1=m_2=2$ by using for each block in FIG. 4f the arrangement of FIG. 7. In this case one finds that each connection 450 between two stages in FIG. 4f involves a 2×1 element directly connected to a 1×2 element, as shown by 451 in FIG. 4g. Therefore each pair of elements 451 of FIG. 4g can be replaced by a single 2×2 element 452 and the final result is the arrangement of FIG. 4h, which is attractive because it is simple to realize in integrated form and it has negligible first-order crosstalk. Notice the above result, the occurrence for each connection between two blocks in FIG. 4f of a 2×1 element directly connected to a 1×2 element, is a general property of FIG. 4f whenever each building block is fully dilated. Then one of the above two elements 451 is redundant, and it can be removed provided the other is replaced by a 2×2 element.

Figure 10:
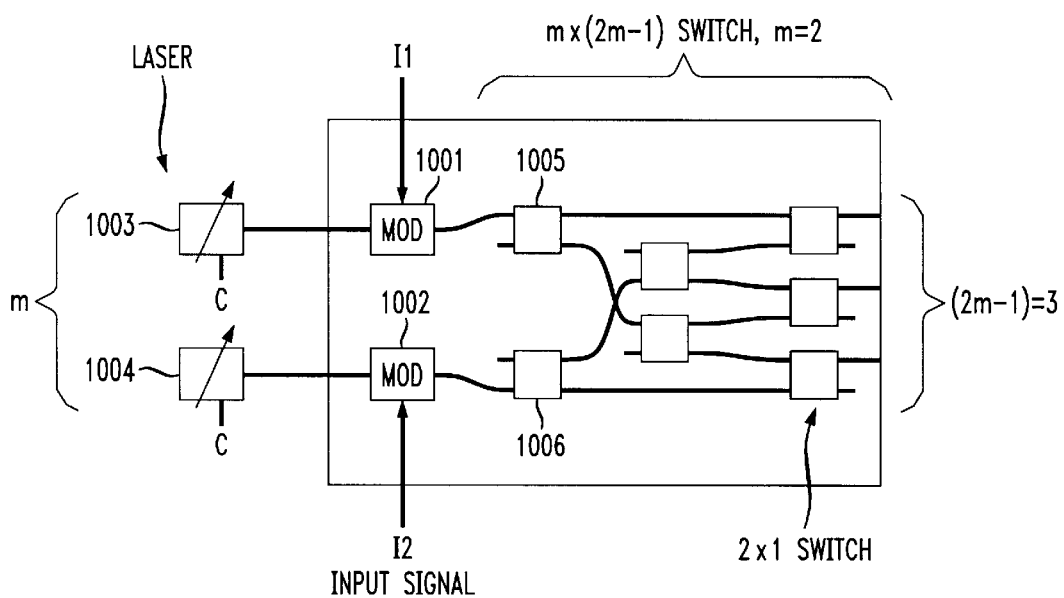
FIG. 10 shows a nonblocking 2×3 input space switch arrangement including two input modulators.

As shown in FIG. 10, an attractive arrangement is obtained by including an input modulator in each of the m inputs. The m×(2m−1) element is shown to include a modulator, 1001 and 1002, to modulate an input signal, I1 and I2, respectively, onto the signal from lasers 1003 and 1004. The wavelength of lasers 1003 and 1004 are selected via a separate control signal C. Recall that the wavelength signal from lasers 1003 and 1004 determine the switching path of the input signals through routers 401 of FIG. 4a. Thus in FIG. 4a, the control signals C1 . . . Ci of the input stage 402 and control signals C'1 . . . C'i of the output stage 403 together with the control signal C of lasers 1003 and 1004 together determine the switching path for each input signal through the N×N switch of FIG. 4a.

Advantages of the above described Clos, FIG. 4, and Crossbar, FIG. 3, arrangements over an arrangement using a single N×N router are 1) that only n laser wavelengths are needed instead of N and that 2) each router can be realized in integrated form with excellent performance in loss and efficiency. Indeed using existing technology, a 128×128 switch would be difficult to realize in a single router. Notice the various n×n routers can be replaced by a conventional folded arrangement of a single grating combined with a lens or a reflector.

In summary, a large N×N switch is constructed in three stages, consisting respectively of n×n wavelength routers combined with input and output stages of space switches. Each input switch is connected to a multiwavelength laser. The input space switch of FIG. 10 includes m modulators, to which m inputs and m multiwavelength laser signals connect, followed by a nonblocking m×m(2m−1) switch arrangement of 2×2 switching elements. The resulting input space switch is suitable for realization in integrated form.

Figure 11:
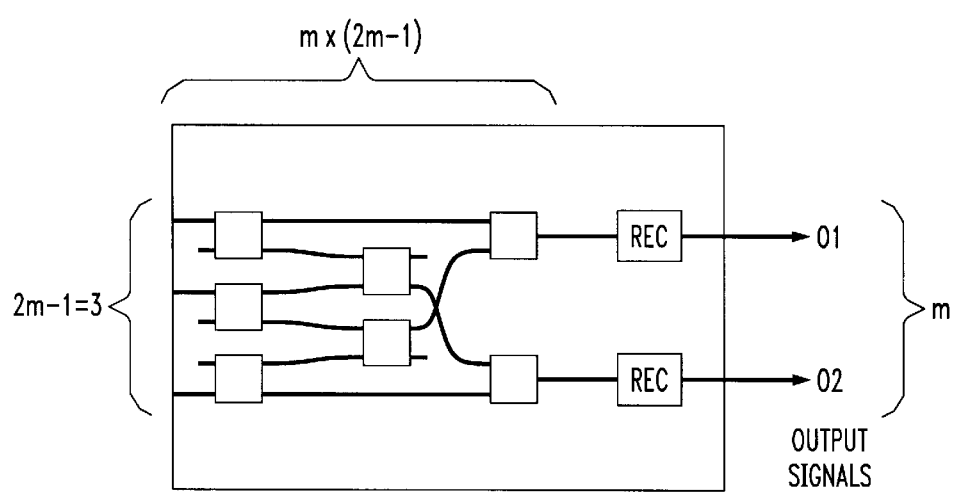
FIG. 11 shows a nonblocking 3×2 output space switch arrangement including two receivers.

Each input laser signal is first modulated by an input data signal and the switch then transfers it to a particular router, which transmits the modulated signal to a particular output port determined by the laser wavelength. In the output space switch shown in FIG. 11, an m×(2m−1) switch arrangement is followed by m receivers. In the simplest case, an N×N electronic switch is realized by using n=N/m input space switches (of FIG. 10) and n=N/m output space switches (of FIG. 11) in addition to 2m−1 routers (401 of FIG. 4a).

What has been described is merely illustrative of the application of the principles of the present invention. Other methods and arrangements can be implemented by those skilled in the art without departing from the spirit and scope of the present invention.

Appendix A

Ideally one would like the router of FIG. 1 to be characterized by a set of N wavelengths $\lambda_j$ such that the transmission coefficient from any input port to any output port has a transmission peak at one of the above wavelengths [1,5]. In reality, if the router is designed to produce the above property for a particular input port, for instance the central port, one finds that the above property only approximately applies to the other ports. As a consequence, the router is afflicted by wavelength errors that increase with N and, in order for these errors to be small, one must require $$N < 36\sqrt{\frac{100}{\text{GHz}}}.$$

GHz is the channel spacing in GHz. For instance, for a channel spacing of 50 GHz one must require N<52. This value can be increased by a factor 1.25 by modifying the router, by widening its passband as in [6], but this technique also increases loss and crosstalk by about 3 dB.

The router of FIG. 1 consists of N input waveguides, N output waveguides, two dielectric slabs, and a waveguide grating connected between the two slabs. The input and output waveguides are connected to the two slabs with equal spacing a and the waveguides (arms) of the grating between the two slabs are characterized by a constant path-length difference. As a consequence each transmission coefficient from a particular input waveguide to a particular output waveguide is essentially characterized by periodic behavior, with equally spaced peaks, and each peak is produced by a particular order p of the grating. In particular, the wavelengths $\lambda$ of maximum transmission from the i-th input waveguide to the output k-th waveguide are specified by the relation $$\frac{x_i - x_k}{R} = \frac{p\lambda - p_0\lambda_0}{b} \quad (1)$$

where the various parameters shown in FIG. 1 are defined as follows:

$x_i$, $x_k$ are the coordinates specifying the locations of the two waveguides, b is the spacing of the receiving and transmitting ends of the arms, $p_0$ is a particular order p, $\lambda_0$ is the central wavelength of maximum transmission for i=k and p=$p_0$, R is the radial distance of the input and output waveguides from the central arm of the grating.

Notice in the above expression we can write $$p\lambda - p_0\lambda_0 = (p-p_0)\lambda_0 + p_0(\lambda-\lambda_0) + (p-p_0)(\lambda-\lambda_0) \quad (2)$$

where the last term can be neglected if either $\lambda-\lambda_0$ or $p-p_0$ is small. By properly choosing the spacing a of the input and output waveguides so that $$a = \frac{1}{N}\frac{R\lambda_0}{b}$$

one obtains from the above expression (1) the wavelengths of maximum transmission $$\lambda = \lambda_0 + \left[\frac{i-k}{N} - (p-p_0)\right]\frac{\lambda_0}{p_0} \quad (3)$$

We choose among these wavelengths the particular subset of N wavelengths $\lambda_j$ obtained for i=0, k=j and p=$p_0$. This subset has an important property, obtained approximately by neglecting the last term of (2) so as to simplify Eq. (3) simplifies to $$\lambda \simeq \lambda_0 + \left[\frac{i-k}{N} - (p-p_0)\right]\frac{\lambda_0}{p_0}$$

According to this expression each transmission coefficient has a peak at one of the above wavelengths $\lambda_j$, and the appropriate values of j,p producing each peak are related in a simple way to i,k. On the other hand, the neglected term causes the actual wavelengths at the peaks corresponding to $\lambda_j$ to deviate from $\lambda_j$i. The errors can be reduced by a factor two by slightly displacing the output waveguides from their initial locations, and the maximum wavelength error is then given by $$\delta\varepsilon \simeq \frac{\lambda_0}{4p_0}$$

Then, by using a conventional (narrow band) design [6] one must require

N<0.36$p_0$ in order to keep the loss caused by the above error below 1 dB. In the above expression $p_0$ is determined by the channel spacing $$\frac{\lambda_0}{N_0 p_0}$$

and therefore we obtain the final result $$N < 36\sqrt{\frac{100}{\text{GHz}}}.$$

For instance, for a channel spacing of 50 GHz, we must require N<52. This value can be increased by a factor 1.25 by widening the passband as in [6], but this technique also increases loss and crosstalk by about 3 dB. The above restriction only arises because we have specified the same comb of N wavelength for all input ports. By allowing a different comb of wavelengths for each input port, the above restriction is removed, but a total of N combs (including a total of 2N−1 wavelengths) is then required in order to provide maximum transmission from all input ports. Here we are assuming that each comb is produced by a multiwavelength laser. Therefore, since different lasers produce different combs, each laser is centered at a different wavelength and the arrangement becomes difficult to design. The above considerations give one reason for which small values of N are desirable in FIG. 1. As pointed out in the introduction, additional reasons are 1) that it is generally desirable to simplify the laser design by reducing the number of wavelengths required from each laser and 2) that a router with large N>64 is difficult to design in integrated form with satisfactory values of loss and crosstalk On the other hand, the neglected term causes the actual wavelengths at the peaks corresponding to $\lambda_j$ to deviate from $\lambda_y$. The errors can be reduced by a factor two by slightly displacing the output waveguides from their initial locations, and the maximum wavelength error is then given by $$\delta\varepsilon \simeq \frac{\lambda_0}{4p_0}$$

Then, by using a conventional (narrow band) design [6] one must require

N<0.36$p_0$ in order to keep the loss caused by the above error below 1 dB. In the above expression $p_0$ is determined by the channel spacing $$\frac{\lambda_0}{N_0 p_0}$$

and therefore we obtain the final result $$N < 36\sqrt{\frac{100}{\text{GHz}}}.$$

For instance, for a channel spacing of 50 GHz, we must require N<52. This value can be increased by a factor 1.25 by widening the passband as in [6], but this technique also increases loss and crosstalk by about 3 dB. The above restriction only arises because we have specified the same comb of N wavelength for all input ports. By allowing a different comb of wavelengths for each input port, the above restriction is removed, but a total of N combs (including a total of 2N−1 wavelengths) is then required in order to provide maximum transmission from all input ports. Here we are assuming that a multiwavelength laser produces each comb. Therefore, since different lasers produce different combs, each laser is centered at a different wavelength and the arrangement becomes difficult to design. The above considerations give one reason for which small values of N are desirable in FIG. 1. As pointed out in the introduction, additional reasons are 1) that it is generally desirable to simplify the laser design by reducing the number of wavelengths required from each laser and 2) that a router with large N>64 is difficult to design in integrated form with satisfactory values of loss and crosstalk.

APPENDIX B

REFERENCES

[1] Doerr, C., Dragone, C., Glass, A., and Kaminow, I. P., "A Broadband Electronic N×N Cross-Connect Switch Using Tunable Lasers", U.S. patent application, Ser. No. 09/400, 240, Filed on Sep. 21, 1999.

[2] Bernasconi, P., Doerr, C. R., Dragone, C., Cappuzzo, M., Laskowski, E., and Paunescu, A., "Large N×Waveguide Grating Routers, Journal of Lightwave Technology Systems," IEEE Communications Magazine, 18 (7): pp. 985–991, July 2000 May 1987.

[3] Padmanabhan, K., and Netravali, A., "Dilated Networks for Photonic Switching," IEEE Transactions on Communications, Vol. COM-35, No. 12, pp. 1357–1365, December 1987.

[4] Clos, C., "A Study of Non-blocking Switching Networks," B.S.T.J., 32, 1953, pp. 406–424.

[5] Dragone, C., "An N×N optical multiplexer using a planar arrangement of two star couplers," IEEE Photon. Technol. Lett., vol. 3, pp. 812–815, Sept. 1991.

[6] Dragone, C., "Efficient techniques for widening the passband of a Wavelength Router", IEEE Journal of Lightwave Technology, Vol. 16, No. 10, October 1998, pp. 1895–1906. These techniques are also discussed in the three U.S. patents filed in 1994: U.S. Pat. No. 5,412,744, U.S. Pat. No. 5,467,418, U.S. Pat. No. 5,488,680.

[7] Dragone, C., "Optimum Design of a Planar Array of Tapered Waveguides," J. Opt. Soc. Amer. A., Vol. 7, No. 11, pp. 2081–2093, Nov. 1990, Applied Optics, Apr. 26, 1987.

What is claimed is:

1. An N×N nonblocking optical switch for providing a connection between any of N inlets and any of N outlets, where N is an integer, the N×N switch comprising an input stage including a plurality of input space switches, each input port of each of the input space switches connects to a different one of the N inlets;

an output stage including a plurality of output space switches, each output port of each of the output space switches connects to a different one of the N outlets;

a center stage connected between the input stage and the output stage, the center stage including a plurality of N/m×N/m wavelength routers, m being an integer divisor of N, wherein different inputs of each router are connected to different input switches, different outputs of each router are connected to different output switches, and the input and output stages allow any idle input port of an input switch, and any idle output port of an output switch, to be simultaneously connected to at least one of the routers, without disturbing existing connections; and wherein a signal received at an input port of the input stage is sent from that input stage using a wavelength that is not changed in its passage through the center stage to the output stage.

2. The N×N switch of claim 1 wherein the input stage includes a plurality, N/m, of m×(2m−1) input space switches, each input of each of the m×(2m−1) input space switches connects to a different one of the N inlets;

the output stage includes a plurality, N/m, of (2m−1)×m output space switches, each output of each of the (2m−1)×m output space switches connects to a different one of the N outlets; and the center stage is connected between the input stage and the output stage, the center stage including a plurality, (2m−1), of N/m×N/m wavelength routers, wherein the N/m inputs of each N/m×N/m wavelength router are connected to different m×(2m−1) input space switches, and the N/m outputs of each N/m×N/m wavelength router are connected to different (2m−1)×m output space switches.

3. The N×N switch of claim 1 wherein
the input stage consists of 1×2 switches, the output stage consists of 2×1 switches, the central stage consists of four N/4×N/4 routers, and any input switch is connected to any output switch via one of the four routers.

4. The N×N switch of claim 1 wherein
the input stage includes a plurality, N/m, of m×p input space switches, where p is an integer, characterized by p satisfying p>2m−1, and each input of each of the m×p input space switches connects to a different one of the N inlets;

the output stage includes a plurality, N/m, of p×m output space switches, each output of each of the p×m output space switches connects to a different one of the N outlets; and the center stage is connected between the input stage and the output stage, the center stage including a plurality, p, of N/m×N/m wavelength routers, wherein the N/m inputs of each N/m×N/m wavelength router are connected to different m×p input space switches, and the N/m outputs of each N/m×N/m wavelength router are connected to different p×m output space switches, so that each router is connected to all input and output switches.

5. The N×N switch of claim 4 wherein
the integers m,p are given by $m=m_1m_2$ an $p=p_1p_2$ with $p_1=2m_1-1$ and $p_2=2m_2-1$ where $m,m_1m_2$ are integer divisors of N, each m×p input switch consists of two stages, respectively made up of a number $M_2$ of $m_1 \times p_1$ switches and a number $p_1$ of $m_2 \times p_2$ switches, such that each switch of either stage is connected to each switch of the other stage, and and each p×m output switch consists of two stages, respectively made up of a number $p_1$ of $p_2 \times m_2$ switches and a number $m_2$ of $p_1 \times m_1$ switches, such that each switch of either stage is connected to each switch of the other stage.

6. The N×N switch of claim 5 wherein
each $m_1 \times p_1$ and each $m_2 \times p_2$ switch is fully dilated.

7. The N×N switch of claim 5 wherein
each $m_1 \times p_1$ and each $m_2 \times p_2$ switch is fully dilated and each connection consisting of a 2×1 element of one of the $m_1 \times p_1$ switches directly connected to a 1×2 element of one of the $m_2 \times p_2$ switches is replaced by a single 2×2 element.

8. The N×N switch of claim 2 wherein
m=2 and each m×(2m−1) input space switches and each (2m−1)×m output space switch is fully dilated and it consists of seven elements forming two input binary trees, each including two 1×2 elements, connected to three 2×1 output elements, with only one waveguide crossing.

9. The N×N switch of claim 5 wherein
$m_1=m_2=2$ and each $m_1 \times p_1$, $m_2 \times p_2$, $p_1 \times m_1$, $p_2 \times m_2$, switch is fully dilated.

10. The N×N switch of claim 5 wherein
$m_1=m_2=2$ and each $m_1 \times p_1$ and $m_2 \times p_2$ switch of the input stage is fully dilated and it consists two 1×3 input binary trees, each input tree including two 1×2 elements connected to three 2×1 output elements to form a nonblocking 2×3 switch, and each connection between a $m_1 \times p_1$ and a $m_2 \times p_2$ switch involving a 2×1 element directly connected to a 1×2 element is replaced with a single 2×2 element, thereby reducing the number of elements by one for each connection, and where the construction of the output stage of switches $p_1 \times m_1$ and $p_2 \times m_2$ is the mirror image of the input stage.

11. The N×N switch of claim 10 wherein
each $m_1 \times p_1$ and $m_2 \times p_2$ switch of the input stage and each $p_1 \times m_1$ and $p_2 \times m_2$ switch of the output stage has only one waveguide crossing.

12. The N×N switch of claim 2 where m=2 and each input and output switch consists of three elements without waveguide crossings.

13. The N×N switch of claim 2 wherein
m=3 and each m×(2m−1) input space switches and each (2m−1)×m output space switch is fully dilated and it consists of 22 elements forming three input binary trees of 1×2 elements, connected to five output binary trees of 2×1 elements, with eight waveguide crossing.

14. The N×N switch of claim 1 wherein each of the routers is implemented as an integrated device.

15. The N×N switch of claim 1 wherein each of the input space switches is implemented as an integrated device.

16. The N×N switch of claim 1 wherein each of the output space switches is implemented as an integrated device.

17. The N×N switch of claim 1 wherein
at least one of the output space switches includes an optical receiver at each of its outputs for receiving an optical signal.

18. The N×N switch of claim 1 wherein
at least one of the input space switches includes a tunable laser at each of its input ports for providing a laser signal thereto.

19. The N×N switch of claim 1 wherein the input space switches and output space switches are implemented using 1×2, 2×1, and 2×2 switches.

20. The N×N switch of claim 1 wherein the input space switches and output space switches are implemented using only 1×2 and 2×1 switches.

21. The N×N switch of claim 2 wherein m=3 and each input and output switch consists of not more than 10 elements with three waveguide crossings.

* * * * *